United States Patent
Abuelsaad et al.

(10) Patent No.: US 9,454,905 B2
(45) Date of Patent: Sep. 27, 2016

(54) SAFE DISTANCE DETERMINATION

(71) Applicant: GLOBALFOUNDRIES INC., Grand Cayman (KY)

(72) Inventors: Tamer E. Abuelsaad, Somers, NY (US); John Elbert Moore, Jr., Indianapolis, IN (US); Rajeshkumar N. Singi, Marietta, GA (US); Robert Richard Wentworth, Austin, TX (US)

(73) Assignee: GLOBAL FOUNDRIES INC., Grand Cayman (KY)

( * ) Notice: Subject to any disclaimer, the term of this patent is extended or adjusted under 35 U.S.C. 154(b) by 47 days.

(21) Appl. No.: 13/873,164

(22) Filed: Apr. 29, 2013

(65) Prior Publication Data
US 2014/0324329 A1 Oct. 30, 2014

(51) Int. Cl.
*G08G 1/16* (2006.01)
*B60Q 1/52* (2006.01)
*B60Q 9/00* (2006.01)

(52) U.S. Cl.
CPC .............. *G08G 1/163* (2013.01); *B60Q 1/525* (2013.01); *B60Q 9/008* (2013.01); *B60Q 2900/30* (2013.01)

(58) Field of Classification Search
CPC ............................. G08G 1/133; G08G 1/137
USPC ........... 701/96, 466–473, 300–302; 340/438, 340/467, 902–904; 356/3.12–3.16; 246/167 D
See application file for complete search history.

(56) References Cited

U.S. PATENT DOCUMENTS

| | | | |
|---|---|---|---|
| 3,892,483 A | 7/1975 | Saufferer | |
| 4,524,931 A | 6/1985 | Nilsson | |
| 4,803,488 A | 2/1989 | Dombrowski et al. | |
| 5,249,157 A | 9/1993 | Taylor | |
| 5,432,509 A * | 7/1995 | Kajiwara | B60Q 9/008 180/271 |
| 5,521,579 A | 5/1996 | Bernhard | |
| 5,717,377 A | 2/1998 | Gao | |
| 6,304,811 B1 | 10/2001 | Prestl | |
| 6,594,574 B2 * | 7/2003 | Isogai | B60K 31/0008 180/170 |
| 6,804,606 B2 * | 10/2004 | Jones | 701/465 |

(Continued)

OTHER PUBLICATIONS http://books.google.nl/books?id=lt7fAH0s7QYC&pg=PA362&lpg=PA362&dq=vehicle+distance+%22lead+vehicle%22+deceleration+weather&source=bl&ots=sKptmPFSgO&sig=ozix2m5mlak7xUr1HJL29OOK-T0&hl=nl&sa=X&ei=MnylUM60OMq80QWzrIGYDA&ved=0CDwQ6AEwAw#v=onepage&q=vehicle%20distance%20%22lead%20-vehicle%22%20deceleration%20weather&f=false.

(Continued)

*Primary Examiner* — Jerrah Edwards
*Assistant Examiner* — Majdi Alsomiri
(74) *Attorney, Agent, or Firm* — DeLio, Peterson & Curcio, LLC; Kelly M. Nowak

(57) ABSTRACT

A method includes, a first computer determining a stopping distance information for a first vehicle; broadcasting the stopping distance information for the first vehicle to at least one other vehicle; a second computer, in the at least one other vehicle, receiving the stopping distance information for the first vehicle determines a first distance between the at least one other vehicle and the first vehicle; and the second computer determining a proper distance for the at least one other vehicle based on the received stopping distance information of the first vehicle.

18 Claims, 3 Drawing Sheets

(56) References Cited

U.S. PATENT DOCUMENTS

| | | | |
|---|---|---|---|
| 6,871,145 | B2 | 3/2005 | Altan et al. |
| 7,124,027 | B1 | 10/2006 | Ernst, Jr. |
| 7,363,140 | B2 | 4/2008 | Ewerhart et al. |
| 7,486,199 | B2 | 2/2009 | Tengler et al. |
| 7,629,899 | B2 * | 12/2009 | Breed ................ 340/903 |
| 8,311,858 | B2 * | 11/2012 | Everett ............ G06Q 40/08 246/45 |
| 8,957,772 | B2 * | 2/2015 | Mauderer .............. B60T 7/22 340/435 |
| 2002/0082770 | A1 * | 6/2002 | Jones ....................... 701/201 |
| 2003/0098802 | A1 * | 5/2003 | Jones ....................... 340/994 |
| 2004/0102985 | A1 | 5/2004 | Wahlbin et al. |
| 2006/0212215 | A1 | 9/2006 | Koulinitch |
| 2007/0106475 | A1 * | 5/2007 | Kondoh ............ B60K 26/021 701/301 |
| 2008/0091352 | A1 * | 4/2008 | O'Hare ...................... 701/301 |
| 2008/0147253 | A1 * | 6/2008 | Breed .......................... 701/3 |
| 2009/0105953 | A1 * | 4/2009 | Sugano ............... B60W 50/16 701/301 |

OTHER PUBLICATIONS

Jeff Davis, "Discussion of How to Understand Brick Wall Stop Measurements and Issues, " http://faculty.washington.edu/jbs/itrans/BWS-Davis.htm.

Burgett, et al. "A Collision Warning Algorithm for Rear-End Collisions," National Highway Traffic Safety Administration, United States, Paper No. 98-S2-P-3 1, pp. 566-587. http://www-nrd.nhtsa.dot.gov/pdf/Esv/esv16/98S2P31.PDF.

\* cited by examiner

SAFE DISTANCE DETERMINATION

BACKGROUND

The present invention relates to safe distance determination, and more specifically, to safe stopping distance determination and the broadcasting of that determination.

SUMMARY

According to one aspect of the present invention, a method includes, a first computer determining a stopping distance information for a first vehicle; broadcasting the stopping distance information for the first vehicle to at least one other vehicle; a second computer, in the at least one other vehicle, receiving the stopping distance information for the first vehicle determines a first distance between the at least one other vehicle and the first vehicle; and the second computer determining a proper distance for the at least one other vehicle based on the received stopping distance information of the first vehicle.

According to another one aspect of the present invention, a computer system includes, one or more processors, one or more computer-readable memories and one or more computer-readable, tangible storage devices; a first module operatively coupled to at least one of the one or more storage devices for execution by at least one of the one or more processors via at least one of the one or more memories, configured to determine a stopping distance information for a first vehicle; a second module coupled to at least one of the one or more storage devices for execution by at least one of the one or more processors via at least one of the one or more memories, configured to broadcast the stopping distance information for the first vehicle to at least one other vehicle; a third module, in the at least one other vehicle, receiving the stopping distance information for the first vehicle, operatively coupled to at least one of the one or more storage devices for execution by at least one of the one or more processors via at least one of the one or more memories, configured to determine a first distance between the at least one other vehicle and the first vehicle, wherein the third module is further configured to determine a proper distance for the at least one other vehicle based on the received stopping distance information of the first vehicle.

According to another one aspect of the present invention, a computer program product includes, one or more computer-readable, tangible storage medium; program instructions, stored on at least one of the one or more storage medium, to determine a stopping distance information for a first vehicle; program instructions, stored on at least one of the one or more storage medium, to broadcast the stopping distance information for the first vehicle to at least one other vehicle; program instructions, stored on at least one of the one or more storage medium, to receive the stopping distance information for the first vehicle and determine a first distance between the at least one other vehicle and the first vehicle; and program instructions, stored on at least one of the one or more storage medium, to determine a proper distance for the at least one other vehicle based on the received stopping distance information of the first vehicle.

DETAILED DESCRIPTION

Figure 1:
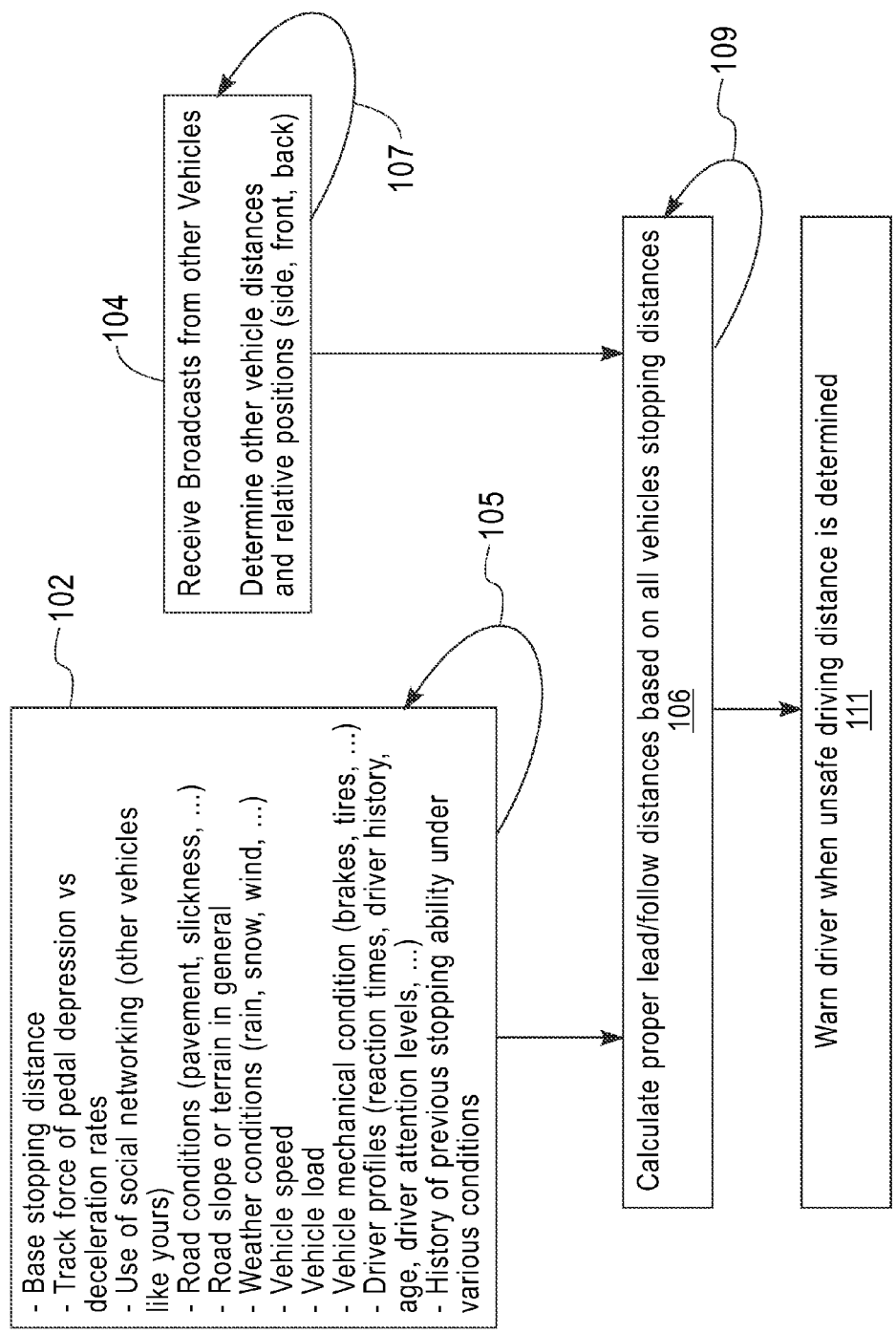
FIG. 1 illustrates a process for warning a driver when an unsafe driving distance is determined according to an embodiment of the present invention.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting. As will be appreciated by one skilled in the art, aspects of the present invention may be embodied as a system, method or computer program product.

With reference now to FIG. 1 illustrates a flowchart according to embodiment of the present invention. Vehicles, and especially industrial vehicles, do not have the ability to estimate their own stopping distance or the stopping distance of adjacent vehicles. This type of measurement is helpful to guide/educate drivers in proper leading and/or following distances as well as providing information when attempting to shift lanes around other vehicles.

When following a vehicle, the proper following distance is not just related to your speed and ability to break, but also of the ability of the vehicle in front of you. If the lead vehicle has the ability to stop faster than the following vehicle, the following vehicle should increase the distance between the two vehicles. This information is also beneficial before making lane changes as to provide warnings prior to the making the shift. For example if a vehicle did cut in front of a tractor-trailer and have to stop suddenly, a rear-end accident may occur. Current guidelines use general rules of speed vs average stopping distances and do not take into many other considerations regarding stopping ability such as the condition of the vehicles themselves, road conditions, etc.

The flowchart shown in FIG. 1 illustrates a first process for calculation a first vehicle stopping distance (102). Calculating stopping ability based on real time sensor data and historical data collected from the vehicles allowing the vehicle to learn as conditions change. Input data may include items such as the following:

Track force of pedal depression vs deceleration rates
Use of social networking (other vehicles like yours) to share deceleration rates
Road conditions (pavement, slickness, . . . )
Road slope or terrain in general
Weather conditions (rain, snow, wind, . . . )
Vehicle speed
Vehicle load
Vehicle mechanical condition (brakes, tires, . . . )
Driver profiles (reaction times, driver history, age, driver attention levels, . . . )
History of previous stopping ability under various conditions The vehicle stopping information is then transmitted to all surrounding/nearby vehicles using a peer to peer car "net", bluetooth, shortwave radio, wifi or any other known/implemented car to car network technologies. Once the other vehicles receive the stopping distance information from a vehicle, the vehicles determine the relative distance and position based on the received stopping distance broadcast (104). The position determination can use data from GPS devices, cell phone positioning networks or from other positioning determining devices. It should be noted that all vehicles can have the ability to calculate its own stopping distance calculation based upon the criteria.

The vehicles stopping distances can be calculated in multiple ways, such as weighted averages of the variables above, or by starting with a base number such as the manufacturers reported stopping distance info, or a base number which has been learned by the system based on recent actual breaking rates and then adding or subtracting distances based on the conditions above.

Once a vehicle has calculated its stopping distance it would broadcast that information to other vehicles. This broadcast can be detected by following, leading or adjacent vehicles. Once all vehicles within in the broadcast range have this information the proper leading/following distance can be calculated (106). Warnings to the drivers are issued if the distance in front or behind the vehicle is less then the proper distance (111). The warnings or information could be provided to the driver via multiple audio and/or visual mechanisms such as beeps, synthetic voice, on dash lights, a light beam projection, or even virtual reality (heads up display) via glasses or special windshield. This information could also be detected by a vehicle in adjoining lanes and used to warn the driver if they are about to attempt a lane shift with less than the proper space required to make a safe lane change. The warnings can also indicate if a vehicle that is following too close will be told a warning "You are following too close" and that a first vehicle that is in front of a second vehicle will receive a warning "The car behind you is following too close" It is further noted the process of calculating a vehicle stopping distance, receiving broadcast of other stopping information and determining the relative positions of each, and calculating the proper lead/follow distances is always on going, as depicted by return process loops 105, 107 and 109.

Figure 2:
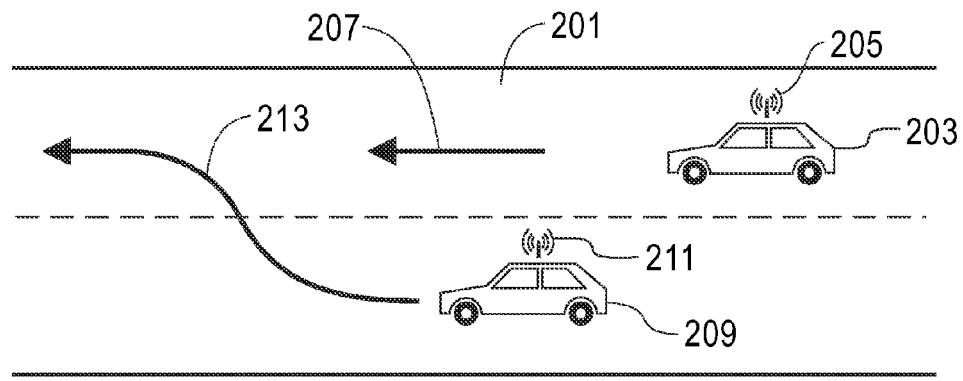
FIG. 2 depicts an exemplary implementation according to an embodiment of the present invention.

FIG. 2 depicts an exemplary implementation according to an embodiment of the present invention. A typical roadway 201 includes vehicles (203, 209) traveling in the same direction 207. As indicated by a lane change arrow 213, vehicle 209 is about to change into the same lane as vehicle 203. As this occurs several processes according an embodiment of the present invention comes into play. Vehicle 203 broadcasts 205 its safe stopping distance. Vehicle 209 receives 211 the stop distance information from vehicle 203 when the vehicles (203, 209) are within communication range. The communication range will vary depending on the communication protocol in use. Onboard computers in the vehicles (203, 209) calculate the safe stopping distance between vehicles after the merge based on the criteria mentioned above. If the vehicles are not within safe stopping distance, warnings are issued to the drivers. The warning displays can be both internal for the individual drivers view or may be external to warn the other vehicle. Another embodiment of the present invention warns the driver of vehicle 209 not to merge. Again, this warning is issued based on the processes of the embodiments of the present invention.

Figure 3:
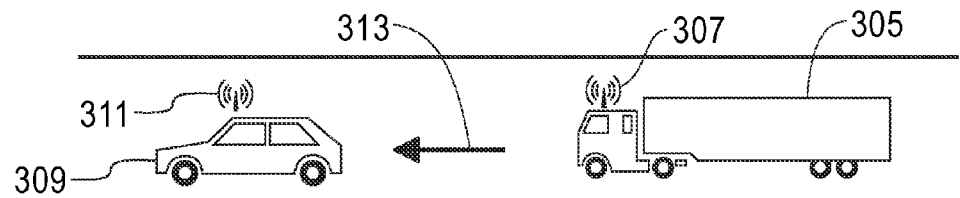
FIG. 3 depicts another exemplary implementation according to an embodiment of the present invention.
Figure 4:
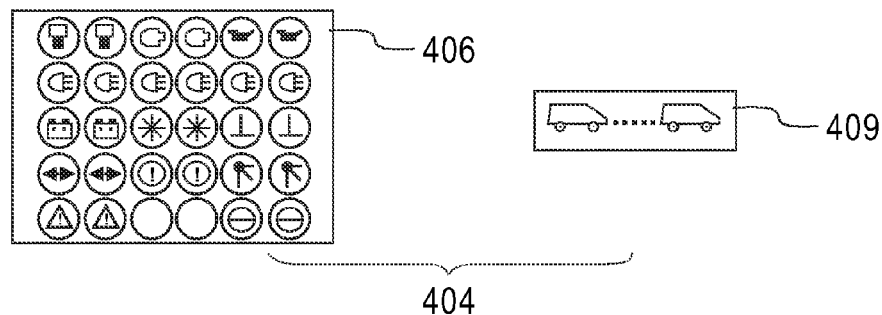
FIG. 4 depicts yet exemplary implementation according to an embodiment of the present invention.

FIGS. 3 and 4 depict other exemplary implementations according to an embodiment of the present invention. A typical roadway 301 includes vehicles (305, 309) traveling in the same direction 313 in the same lane of the roadway 301. As this occurs several processes according an embodiment of the present invention comes into play. Vehicle 305 broadcasts 307 its safe stopping distance. Vehicle 309 receives 311 the stop distance information from vehicle 203 when the vehicles (203, 209) are within communication range. The communication range will vary depending on the communication protocol in use. Onboard computers in the vehicles (305, 309) calculate the safe stopping distance between vehicles based on the criteria mentioned above. If the vehicles are not within safe stopping distance, a warning is issued to the driver of vehicle 305. The warning display is on the exterior of vehicle 309. As shown in FIG. 4, various warning displays 404 are incorporated with a vehicle. Some of the warning displays 406 are displayed to the driver of a vehicle. A non-safe stopping distance warning display 409 so that it is visible from the exterior of the vehicle. The non-safe warning display 409 is displayed to warn the following vehicle.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 5:
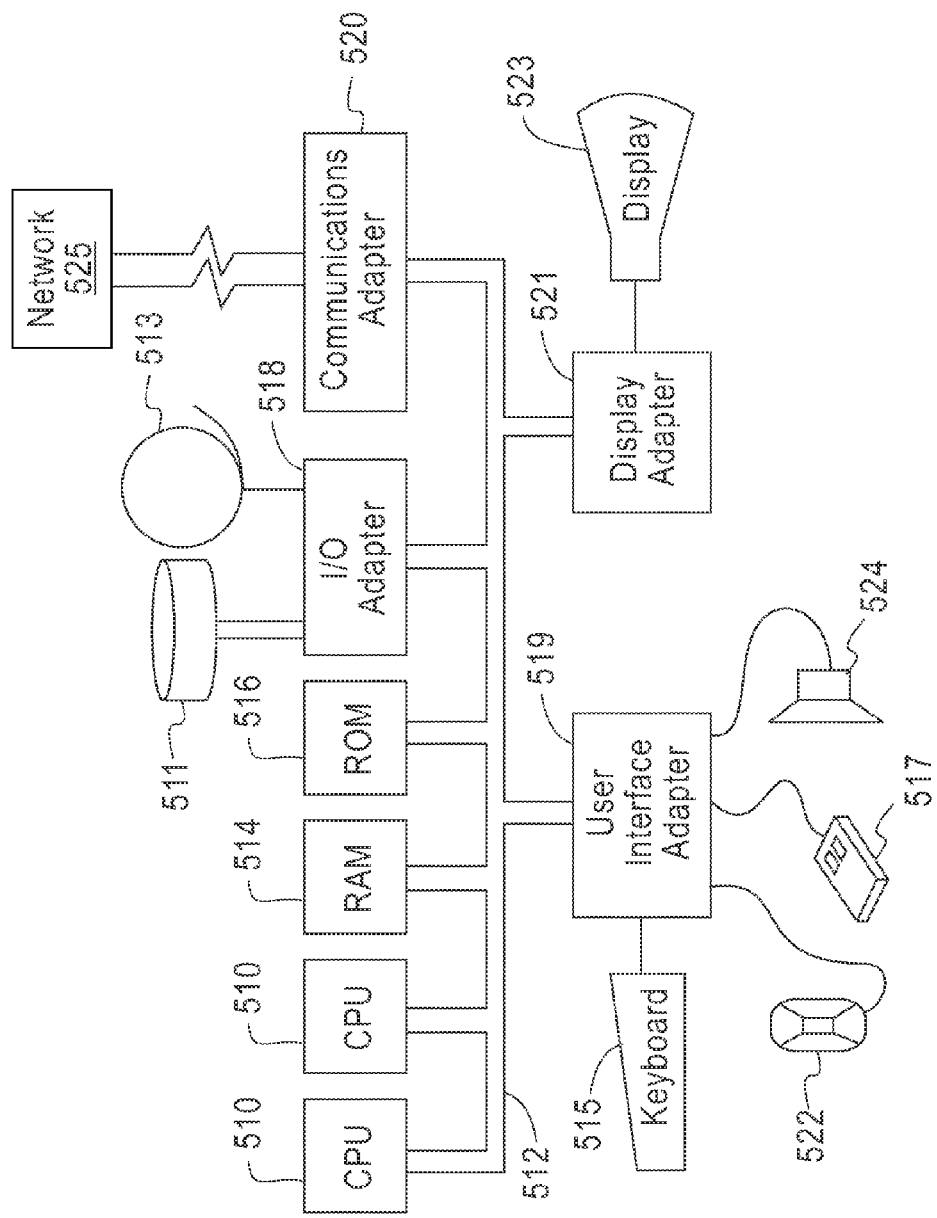
FIG. 5 illustrates a hardware configuration according to an embodiment of the present invention.

Referring now to FIG. 5, this schematic drawing illustrates a hardware configuration of an information handling/computer system in accordance with the embodiments of the invention. The system comprises at least one processor or central processing unit (CPU) 510. The CPUs 510 are interconnected via system bus 512 to various devices such as a random access memory (RAM) 514, read-only memory (ROM) 516, and an input/output (I/O) adapter 518. The I/O adapter 518 can connect to peripheral devices, such as disk units 511 and tape drives 513, or other program storage devices that are readable by the system. The system can read the inventive instructions on the program storage devices and follow these instructions to execute the methodology of the embodiments of the invention. The system further includes a user interface adapter 519 that connects a keyboard 515, mouse 517, speaker 524, microphone 522, and/or other user interface devices such as a touch screen device (not shown) to the bus 512 to gather user input. Additionally, a communication adapter 520 connects the bus 512 to a data processing network 525, and a display adapter 521 connects the bus 512 to a display device 523 which may be embodied as an output device such as a monitor, printer, or transmitter, for example.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
    providing real time sensor data and historical data into a first computer residing in a first vehicle;
    said first computer calculating a first vehicle stopping distance of said first vehicle using at least one of said real time sensor data and historical data;
    a second computer in a second vehicle calculating a second vehicle stopping distance of said second vehicle using at least one of said real time sensor data and historical data;
    broadcasting the first vehicle stopping distance to the second vehicle, and said second vehicle stopping distance to said first vehicle;

at least one of said first computer in said first vehicle or said second computer in the second vehicle calculating a safe stopping distance between the first vehicle and the second vehicle based on said first and second vehicle stopping distances;

determining if a distance residing between said first and second vehicles is not within the safe stopping distance, and if so, sending a warning to a driver of said first or second vehicles indicating a non-safe stopping distance residing between the first and second vehicles.

2. The method according to claim 1, wherein the determined safe stopping distance is displayed within at least one of the first vehicle or the second vehicle.

3. The method according to claim 1, wherein the determined safe stopping distance is broadcasted to at least one of the first vehicle or the second vehicle.

4. The method according to claim 1, further including a plurality of other vehicles each with a computing device, each of said computing devices calculating a vehicle stopping distance for its respective vehicle using said real time sensor data and/or historical data, whereby all vehicle stopping distances of said vehicles are broadcast amongst each other, and calculating safe stopping distances between two or more of said vehicles for sending warnings to drivers of said vehicles if any of said vehicles is within the non-safe stopping distance of another of said vehicles.

5. The method according to claim 1, wherein the first vehicle is in front of the second vehicle, said warning notifying said second vehicle it is following too close in distance to said first vehicle and will not be able to stop in time to prevent collision based on said first and second stopping distances of said first and second vehicles.

6. The method according to claim 1, wherein said warning comprises a visual alert to said driver of said first or second vehicle.

7. The method according to claim 1, wherein said warning comprises an audio to said driver of said first or second vehicle.

8. The method according to claim 1, wherein said warning comprises an alert to another driver of a third vehicle.

9. The method according to claim 1, wherein the real time sensor data includes tracking force of pedal depression vs deceleration rates.

10. The method according to claim 1, wherein the real time sensor data and historical data comprises road condition data.

11. The method according to claim 1, wherein the real time sensor data and historical data comprises weather condition data.

12. The method according to claim 1, wherein the real time sensor data and historical data comprises vehicle load or mechanical condition data.

13. A computer system comprising:
one or more processors, one or more computer-readable memories and one or more computer-readable, tangible non-transitory storage devices;
a first computing module in a first vehicle operatively coupled to at least one of the one or more storage devices for execution by at least one of the one or more processors via at least one of the one or more memories, configured to calculate a first vehicle stopping distance of the first vehicle using at least one of real time sensor data and historical data;
a second computing module in a second vehicle operatively coupled to at least one of the one or more storage devices for execution by at least one of the one or more processors via at least one of the one or more memories, configured to calculate a second vehicle stopping distance of a second vehicle using at least one of said real time sensor data and historical data;
the first and second computing modules coupled to at least one of the one or more storage devices for execution by at least one of the one or more processors via at least one of the one or more memories, configured to broadcast the first vehicle stopping distance to the second vehicle, and the second vehicle stopping distance to the first vehicle;
the first and second computing modules configured to calculate a safe stopping distance between the first vehicle and the second vehicle based on said first and second vehicle stopping distances, and operatively coupled to at least one of the one or more storage devices for execution by at least one of the one or more processors via at least one of the one or more memories, and configured to determine if a distance residing between said first and second vehicles is not within the safe stopping distance, and if so, configured to send a warning to a driver of said first or second vehicles indicating a non-safe stopping distance residing between the first and second vehicles.

14. The system according to claim 13, wherein the determined safe stopping distance is displayed within at least one of the first vehicle or the second vehicle.

15. The system according to claim 13, wherein the determined safe stopping distance is broadcasted to at least one of the first vehicle or the second vehicle.

16. A computer program product comprising:
one or more computer-readable, tangible non-transitory storage medium;
program instructions, stored on at least one of the one or more storage medium, to calculate a first vehicle stopping distance of a first vehicle using at least one of real time sensor data and historical data;
program instructions, stored on at least one of the one or more storage medium, to calculate a second vehicle stopping distance of a second vehicle using at least one of said real time sensor data and historical data;
program instructions, stored on at least one of the one or more storage medium, to broadcast the first vehicle stopping distance to the second vehicle, and the second vehicle stopping distance to the first vehicle;
program instructions, stored on at least one of the one or more storage medium, to calculate a safe stopping distance between the first vehicle and the second vehicle based on said first and second vehicle stopping distances; and
program instructions, stored on at least one of the one or more storage medium, to determine if a distance residing between said first and second vehicles is not within the safe stopping distance, and if so, send a warning to a driver of said first or second vehicles indicating a non-safe stopping distance residing between the first and second vehicles.

17. The computer program product according to claim 16, wherein the determined safe stopping distance is broadcasted to at least one of the first vehicle or the second vehicle.

18. The computer program product according to claim 17, wherein the program instructions determines the safe-stopping distance by tracking force of pedal depression vs deceleration rates.

* * * * *